(12) United States Patent
Iyuke

(10) Patent No.: US 9,102,525 B2
(45) Date of Patent: Aug. 11, 2015

(54) PROCESS FOR PRODUCING CARBON NANOTUBES

(75) Inventor: Sunny Esayegbemu Iyuke, Johannesburg (ZA)

(73) Assignee: University of the Witwatersrand, Johannesburg (ZA)

( * ) Notice: Subject to any disclaimer, the term of this patent is extended or adjusted under 35 U.S.C. 154(b) by 0 days.

(21) Appl. No.: 12/064,440

(22) PCT Filed: Aug. 29, 2006

(86) PCT No.: PCT/IB2006/002350
§ 371 (c)(1),
(2), (4) Date: Jun. 3, 2008

(87) PCT Pub. No.: WO2007/026213
PCT Pub. Date: Mar. 8, 2007

(65) Prior Publication Data
US 2008/0247939 A1    Oct. 9, 2008

(30) Foreign Application Priority Data
Aug. 29, 2005  (ZA) ................... 2005/03438

(51) Int. Cl.
*D01C 5/00* (2006.01)
*D01F 9/12* (2006.01)
*B82Y 30/00* (2011.01)
*B82Y 40/00* (2011.01)
*C01B 31/02* (2006.01)
*B01J 12/02* (2006.01)
(Continued)

(52) U.S. Cl.
CPC ............... *B82Y 30/00* (2013.01); *B01J 4/001* (2013.01); *B01J 8/0055* (2013.01); *B01J 12/02* (2013.01); *B01J 19/006* (2013.01); *B01J 19/02* (2013.01); *B01J 19/2405* (2013.01); *B82Y 40/00* (2013.01); *C01B 31/0233* (2013.01); *B01J 2204/002* (2013.01); *B01J 2204/007* (2013.01); *B01J 2219/00094* (2013.01); *B01J 2219/00772* (2013.01); *B01J 2219/0209* (2013.01)

(58) Field of Classification Search
USPC ............. 423/447.1, 447.3; 422/129, 240, 241
See application file for complete search history.

(56) References Cited

U.S. PATENT DOCUMENTS 2,552,866 A * 5/1951 Ramseyer ................. 48/78
2,902,432 A * 9/1959 Kaulakis et al. ............. 422/144
(Continued)

FOREIGN PATENT DOCUMENTS

WO      02/092506      11/2002
WO   WO 2005102923 A1 * 11/2005

OTHER PUBLICATIONS 102-54-5 CAS MSDS (Ferrocene) Product Description, http://www.chemicalbook.com/ChemicalProductProperty_US_CB1414721.aspx (Jul. 22, 2013).*

(Continued)

*Primary Examiner* — Kaj K Olsen
*Assistant Examiner* — Ross J Christie
(74) *Attorney, Agent, or Firm* — Fish & Richardson P.C.

(57) ABSTRACT

The invention provides a process for producing carbon nanotubes which includes supplying a continuous fluidized feed of a catalyst and at least one hydrocarbon to a reactor operating under conditions suitable to produce carbon nanotubes. The fluid is made to flow though the reactor with a swirling motion which ensures that the internal surfaces of the reactor are cleaned of deposits.

19 Claims, 2 Drawing Sheets

(51) Int. Cl.
*B01J 19/00* (2006.01)
*B01J 19/02* (2006.01)
*B01J 19/24* (2006.01)
*B01J 4/00* (2006.01)
*B01J 8/00* (2006.01)

(56) References Cited

U.S. PATENT DOCUMENTS

| | | | | |
|---|---|---|---|---|
| 4,073,698 | A * | 2/1978 | Blurton et al. | 205/785.5 |
| 4,343,772 | A | 8/1982 | Frosch et al. | |
| 5,102,647 | A * | 4/1992 | Yamada et al. | 423/447.3 |
| 5,584,985 | A * | 12/1996 | Lomas | 208/113 |
| 6,759,025 | B2 * | 7/2004 | Hong et al. | 423/447.3 |
| 6,794,599 | B2 * | 9/2004 | Kajiura et al. | 219/121.11 |
| 6,878,360 | B1 * | 4/2005 | Ohsaki et al. | 423/447.3 |
| 2002/0102193 | A1 * | 8/2002 | Smalley et al. | 422/190 |
| 2003/0010279 | A1 * | 1/2003 | Nakayama et al. | 117/84 |
| 2003/0211030 | A1 * | 11/2003 | Olivier et al. | 423/447.3 |
| 2004/0062992 | A1 * | 4/2004 | Kajiura et al. | 429/231.8 |
| 2004/0168904 | A1 * | 9/2004 | Anazawa et al. | 204/164 |
| 2004/0253374 | A1 * | 12/2004 | Jung et al. | 427/213 |
| 2005/0042042 | A1 * | 2/2005 | Clarke | 406/108 |
| 2005/0067349 | A1 * | 3/2005 | Crespi et al. | 423/461 |
| 2005/0074392 | A1 * | 4/2005 | Yang et al. | 423/447.3 |
| 2005/0123467 | A1 * | 6/2005 | Harutyunyan | 423/447.1 |
| 2005/0230240 | A1 * | 10/2005 | Dubrovsky et al. | 422/186.04 |
| 2005/0238566 | A1 * | 10/2005 | Rao et al. | 423/447.3 |
| 2006/0078489 | A1 * | 4/2006 | Harutyunyan et al. | 423/447.3 |
| 2006/0104889 | A1 * | 5/2006 | Harutyunyan et al. | 423/447.3 |
| 2006/0104890 | A1 * | 5/2006 | Harutyunyan et al. | 423/447.3 |
| 2006/0228289 | A1 * | 10/2006 | Harutyunyan et al. | 423/447.3 |
| 2006/0284538 | A1 * | 12/2006 | Harutyunyan | 313/311 |
| 2007/0025906 | A1 * | 2/2007 | Pirard et al. | 423/447.3 |
| 2007/0116632 | A1 * | 5/2007 | Harutyunyan | 423/447.3 |
| 2007/0224107 | A1 * | 9/2007 | Hikata | 423/460 |
| 2007/0264187 | A1 * | 11/2007 | Harutyunyan et al. | 423/447.3 |
| 2009/0255799 | A1 * | 10/2009 | Harutyunyan | 204/157.43 |

OTHER PUBLICATIONS

Written Opinion of the International Searching Authority; International Application No. PCT/IB2006/002350; Mar. 13, 2008.

Andrews R et al., "Contingous production of aligned carbon nanotubes: a step closer to commerical realization," Chemical Physics Letters, vol. 303, No. 5-6, pp. 467-474 (1999).

Neumayer H et al., "Formation fo carbon-nano-fibres and carbon-nanotubes with a vertical flow-reactor," Diamond and Related Materials, Elsevier Science Publishers, vol. 13, No. 4-8, pp. 1191-1197 (2004).

* cited by examiner

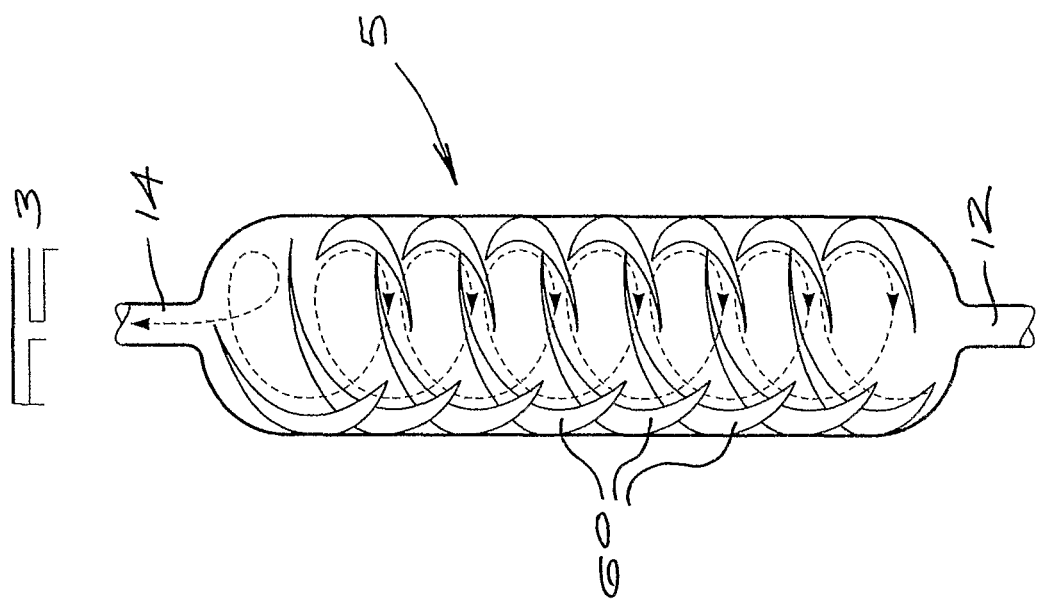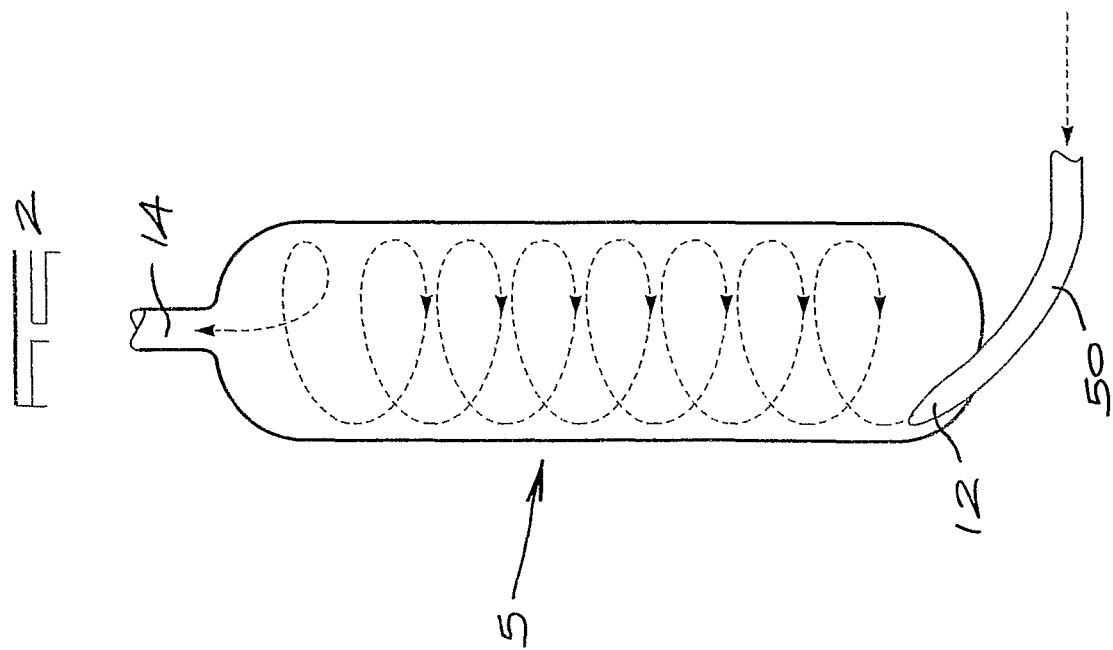

PROCESS FOR PRODUCING CARBON NANOTUBES

FIELD OF THE INVENTION

This invention relates to a process for the production of carbon nanotubes.

BACKGROUND TO THE INVENTION

Carbon nanotubes (CNTS) can be described as graphene sheets rolled into seamless cylindrical shapes (Ebbesen 1994; Poole and Owens 2003) with such a small diameter that the aspect ratio (length/diameter) is large enough to become a one-dimensional structure in terms of electronic transmission. Since its discovery in 1991 by Iijima while experimenting on fullerene and looking into soot residues, two types of nanotubes have been made, which are single-walled carbon nanotubes (SWNTs) and multi-walled carbon nanotubes (MWNTs). SWNT consist only of a single graphene sheet with one atomic layer in thickness, while MWNT is formed from two to several tens of graphene sheets arranged concentrically into tube structures. The SWNTs have three basic geometries, armchair, zigzag and chiral forms. They are promising one-dimensional (1-D) periodic structure along the axis of the tube, where dispersion relations predict interesting electronic characteristics. Electronic transport confinement in the radial direction is maintained by the monolayer thickness of the nanotubes, while circumferentially, periodic boundary conditions are imposed leading into 1-D dispersion relations for electrons and photons in SWNTs. Various experiments and simulations have estimated that about one-third of the nanotubes are metallic and two-third semiconducting as a result of the tube diameter and the chiral angle between its axis and the zigzag direction. Quite a number of resistivity measurements on MWNTs have revealed that some are metallic as much as graphite, and others are semiconducting having resistivity value in the order of 5 greater than the former. Experiments had affirmed that armchair carbon nanotubes are metallic (Ebbesen 1997). Multiwalled nanotubes, on the other hand, have not only shown metallic, semiconducting and mechanical properties, they are also being used for fuel storage such as hydrogen and methane (Iyuke 2001, Iyuke et al. 2004). It is, therefore, interesting to infer that CNT is emerging as a building block for nanotechnology, nanoelectronics, nanomanufacturing and nanofabrication.

The growth of CNTs during synthesis and production is believed to commence from the recombination of carbon atoms split by heat from its precursor. Due to the overwhelming interest, enormous progress is being made in the synthesis of CNTs. Although a number of newer production techniques are being developed, the three main methods are laser ablation, electric arc discharge and chemical vapour deposition (CVD). The last is becoming very popular because of its potential for scale-up production. The existing methods involve batch operation that can only produce maximum amount of 0.5-5 g per day and poor products repeatability. Due to the low production rate, it has an exorbitant cost at US$500 per gram.

CVD methodology in producing CNTs bears little difference to the conventional vapour grown carbon fibre technology. As the latter technology improved into producing thinner carbon fibres from several micrometers to less than 100 nm, the growth of carbon nanotubes synthesised using catalytic CVD has emerged. In both cases, carbon fibres and carbon nanotubes may be grown from the decomposition of hydrocarbons in a temperature range of 500 to 1200° C. They can grow on substrates such as carbon, quartz, silicon, etc., or on floating fine catalyst particles, e.g. Fe from ferrocene, Ni, Co, etc. and from numerous hydrocarbons such as benzene, xylene, toluene, natural gas or methane, acetylene, to mention but a few. The CVD method has been receiving continuous improvement since Yacaman et al. first used it in 1993 and, in 1994, Ivanov et al. produced MWNTs using CVD techniques. Patterned silicon wafers of porous n- and p-type types were used to grow regular arrays of MWNTs (Fan et al. 2000), and SMNTs were grown as low and high whisker population density fastened to the filament fibrils for carbon fibre surface treatment (Iyuke et al. 2000). SWNTs produced from floating catalyst CVD was also presented earlier (Fakhru'l, Iyuke and co-workers, 2003). A typical catalytic chemical vapour deposition system consists of a horizontal tubular furnace as the reactor. The tube is made of quartz tube, 30 mm in diameter and 1000 mm in length. Ferrocene and benzene vapours, acting as the catalyst (Fe) and carbon atom precursors respectively, are transported by either argon, hydrogen or a mixture of both into the reaction chamber, and decompose into the respective ions of Fe and carbon atoms, resulting in carbon nanostructures. $H_2S$ has also been used as carrier gas and CNT yield promoter. The growth of the nanostructures occurs either in the heating zone, or before or after the heating zone, which is normally operated between 500° C. and 1150° C. for about 30 min. The flow of hydrogen gas is 200 ml/min, while argon gas is used to cool the reactor as reported elsewhere (Danna 2004).

However, for crucially specific applications with CNTs, both the mechanical and electrical properties can be harnessed if long (>2 mm) and continuous CNTs can be produced. Such structures could be used as strong, highly conducting microcables or as robust electrochemical microactuators (Zhu et al 2002). Such a breakthrough is still missing in the open literature.

As indicated above present processes for the production of CNTs are batch processes. These suffer the disadvantages of poor repeatability and poor industrial applicability or efficiency.

OBJECT OF THE INVENTION

It is an object of this invention to provide a process which, at least partly, alleviates the abovementioned problems.

SUMMARY OF THE INVENTION

In accordance with this invention there is provided a process for producing carbon nanotubes which includes supplying a continuous fluidized feed of a catalyst and at least one hydrocarbon to a reactor operating under conditions suitable to produce carbon nanotubes and characterised in that fluid flow is non-laminar within the reactor and in that the internal surfaces of the reactor are cleaned of deposits.

Further features of the invention provide for flow in the reactor to be non-linear; for the feed to be introduced into the reactor such that it flows with a swirling motion therethrough; for the reactor to be tubular; for the feed to be introduced into the reactor through a spiral delivery tube; alternately through a tangentially extending nozzle; and for the flow rate to be sufficient to entrain deposits on the reactor surfaces.

Still further features of the invention provide for the feed to include a carrier gas; for the at least one hydrocarbon to include acetylene; for the catalyst to include ferrocene; for the ferrocene to be dissolved in a carrier, preferably xylene; for the ferrocene to be between 1 and 10 wt % of ferrocene in xylene; for the feed to include at least one carrier gas; and for the at least one carrier gas to include hydrogen and argon.

Yet further features of the invention provide for the reactor to be operated at a temperature of between 850 and 1100° C., preferably 1000° C.; and for the feed to be introduced into the reactor at temperatures range of 60 to 90° C. where a xylene/ferrocene mixture is used and at temperatures range of 120 to 150° C. where and solid ferrocene is used.

The invention also provides a reactor for the continuous production of carbon nanotubes including an elongate chamber having an inlet at or near one end and an outlet at or near the opposite end and means for heating the chamber, characterised in that the reactor is configured such that fluid flow therethrough is non-laminar.

Further features of the invention provide for the reactor to be configured such that fluid flow therethrough is non-linear; for the reactor to be configured such that fluid flows with a swirling motion therethrough; and for the inlet to include a spiral conduit; for the spiral conduit to be co-axial with the chamber; alternatively for the inlet to be tangential to the chamber.

Yet further features of the invention provide for the chamber to be cylindrical; and for the chamber to be made from a stainless steel; alternately for the chamber to have a glass lining.

BRIEF DESCRIPTION OF THE DRAWINGS

One embodiment of the invention will be described below by way of example only and with reference to the accompanying drawings in which:

FIG. 2 is a schematic diagram of second embodiment of a reactor for use in the process illustrated in FIG. 1; and FIG. 3 is a schematic diagram of third embodiment of a reactor for use in the process illustrated in FIG. 1.

DETAILED DESCRIPTION OF THE DRAWINGS

Figure 1:
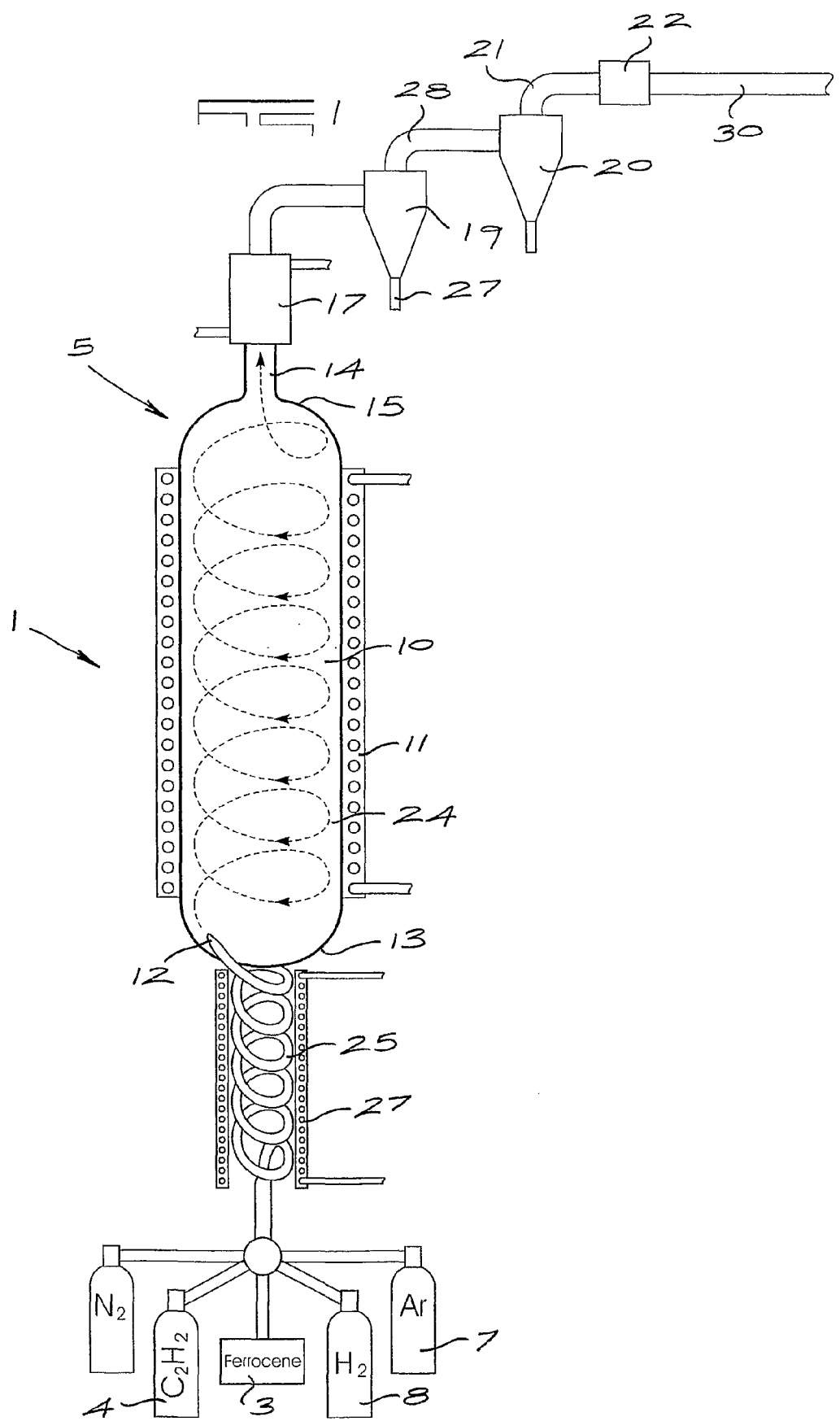
FIG. 1 is a schematic diagram of one embodiment of a process for producing carbon nanotubes.

A process (1) for producing carbon nanotubes (not shown) is illustrated in FIG. 1 and includes feeding a fluidized mixture of a catalyst (3) and hydrocarbon (4) to a reactor (5) under specific conditions described below.

The catalyst (3) used in this embodiment is ferrocene which is a solid at room temperature but vapourises at about 120 to 150° C. However, it is sometimes more convenient to dissolve it in a carrier such as xylene to enable a continuous feed and such a mixture vapourises at about 60 to 90° C. For this reason, the ferrocene or ferrocene/xylene mixture is heated to between 60 and 150° C. and fed with a carrier gas mixture, in this embodiment argon (7) and hydrogen (8), to the reactor (5).

Where a ferrocene/xylene mixture is used ferrocene forms between 5 and 10% of the mixture.

The hydrocarbon (4) used in this embodiment is acetylene and is mixed with hydrogen (8) and argon (7). Hydrogen acts as carrier gas and assists in the thermal decomposition of the hydrocarbon.

The mixture of ferrocene (3), acetylene (4), argon (7) and hydrogen (8) is maintained at a temperature of about 150° C. prior to entering the reactor (5) to prevent the ferrocene (3) from solidifying out of the mixture and forming deposits on the equipment.

The flow rate of the mixture components are as follows:

| Component | Flow rate range | Preferred flow rate |
|---|---|---|
| Ar | 70 to 699 cm$^3$/min | 300 cm$^3$/min |
| H$_2$ | 118 to 248 cm$^3$/min | 181 cm$^3$/min |
| C$_2$H$_2$ | 118 to 370 cm$^3$/min | 305 cm$^3$/min |
| Ferrocene | 1-10 wt % ferrocene/xylene | 5 wt % ferrocene/xylene |
| Ferrocene/xylene | 3.3 to 13 cm$^3$/min | 6 cm$^3$/min |

The rate equation obtained for possible process scale up is:

$$-r_{C_2H_2} = \frac{kKC^n}{1+KC^n}\exp(1-\theta)$$

where
superscript, n is the order of reaction,
$\theta$ is the fraction of Fe surface occupied by C atoms,
k is the reaction rate constant,
C is either carbon or other graphitised carbon nanoparticles, and
K is the adsorption rate constant as proposed by Langmuir-Hindshelwood mechanism.

The reactor (5) has an elongate, cylindrical chamber (10) made of a stainless steel with a heating jacket (11) thereabout. The axis of the chamber (10) extends in an upright manner with an inlet (12) at the bottom (13) and an outlet (14) at the top (15). A heat exchanger (17) is positioned adjacent the outlet (14) and feeds into a pair of cyclone separators (19, 20) arranged in series with the overflow (21) of the cyclone (20) feeding into a filter (22).

The reactor (5) is operated at a temperature of between 850° C. and 1100° C., preferably at about 1000° C. Under these conditions carbon nanotubes are produced at a rate of 0.7 g/min, with the reaction occurring at a conversion rate of about 97%.

As the reaction occurs through vapour deposition it has been found that the reactor surfaces quickly become clogged and the reactor choked under conditions of simple laminar flow through the reactor. Under laminar flow conditions the catalyst is also found to inactivate quickly.

Surprisingly, it has been found that causing the fluid to flow through the reactor (5) with a swirling motion (24) allows for continuous operation without these disadvantages. In this embodiment the swirling motion is achieved by introducing the feed into the reactor through a spiral delivery tube (25) which extends from the inlet (12) coaxially with the chamber (10). A jacket (27) about the tube (25) maintains it at a temperature of about 150° C.

It is thought that the swirling motion of the fluid in the reactor (5) has two effects. Firstly, it is thought to entrain carbon nanotubes formed on the walls of the chamber (10) and so prevent clogging. Secondly, it is thought that the turbulent flow conditions have the effect of "agitating" the fluid and so cleaning or re-activating the catalyst and exposing it for further reaction with the acetylene.

It is to be expected that the fluid at the outlet (14) will be at a temperature similar to that within the reactor (5), that is about 950° C. It has, however, been found that it has a much lower temperature of about 70° C. The reason for this is not yet apparent. In any event, the heat exchanger (17) cools the fluid to about 30° C. whereafter it flows into the first cyclone separator (19). This is configured to settle 95% of carbon nanotubes in the fluid at its underflow (27). The overflow (28) feeds into the second cyclone separator (20) which is configured to settle the remaining carbon nanotubes and other carbon nanoparticles at its underflow (29). The filter (22) merely ensures that no fines are exhausted to into the recycle stream (30).

The process has been found to work well and to overcome the problems associated with producing carbon nanotubes on a continuous basis. It will be appreciated, however, that many other embodiments of the process and apparatus exist which fall within the scope of the invention. For example, referring to FIG. 2, where like numerals indicate like features, a swirling fluid motion could be created by introducing the feed into the reactor (5) through a tangential or involuted tube (50) extending from the inlet (12). Alternately, as shown in FIG. 3, the reactor (5) could have internal baffles (60). Where baffles are used, it may be necessary to provide means for cleaning the internal surfaces of the reactor of deposits. Such means may include electrostatic precipitators, vibrators, wipers and the like. It may even be desirable to use a mass of fluidized non-reactive particles, such as glass beads, to dislodge deposits from the internal surfaces. The reactor would clearly have to be configured to confine such beads and the gas flow rates be sufficient to fluidise them. Also, the reactor can have any suitable shape and be made of any suitable material.

It will also be apparent that conditions and constituents of the feed, carriers and reactor operating conditions can be much varied and can include those described in the prior art.

REFERENCES

Danna A B M (2004) Characterization and Adsorption Studies of Carbon Nanotubes/Nanofibers for Methane Storage, M S Thesis, Universiti Putra Malaysia Ebbesen T W (1994) Carbon Nanotubes, Annu. Rev. Mater. Sci., 24, 235

Ebbesen T W (1997) Production and Purification of Carbon Nanotube. In Ebbesen W. T. Ed. Carbon Nanotubes: Preparation and Properties. CRC Press, New York, pp 139

Fakhru'l A, Iyuke S E Ali M A, Danna A B M Al-Khatib M F (2003) Carbon Nanoporous Balls Adsorb Methane better than Activated Carbon at Room Temperature and Pressure, Asia Pacific Nanotechnology Forum News Journal, 2(3)

Fan S, Liang W, Dang H, Franklin N, Tombler T, Chapline M (2000) Carbon Nanotube arrays on Silicon Substrates and their Possible Application. Phys E: Low-Dimensional Syst Nanostructures, 8(2); 179

Iijima S (1991) Helical Microtubules of Graphite Carbon. Nature, 354; 56

Ivanov V, Nagy J B, Lambin P, Lucas A, Zhang X B, Zhang X F, Bernaerts D, Tendeloo G V, Amelinckx S, Landuyt J V (1994) The study of Carbon Nanotubules Produced by Catalytic Method, Chem. Phys. Lett., 223; 329

Iyuke S E (2001) Hydrogen Storage in the Interplanar Layers of Graphite Nanofibres Synthessed from Palm Kernel Shell, Proceeding of Chemistry and Technology Conference, PIPOC2001, Malaysia, pp 203-209

Iyuke S E, Yasin F M, Fakhru'l A, Shamsudin S, Mohamad A B, Daud W R W (2000) FCCVD-Coating of Multifilament Carbon Fibres by Whiskerization with Fe Catalyst. ICCE-11, South Carolina, 8-14. p 297

Iyuke S E, Ahmadun F R, Chuah T G, Danna A B M (2004) Methane Storage as Solid- and Liquid-Like Forms in and on Carbon Nanotubes, 4$^{th}$ International Mesostructured Materials Symposim, IMMS, pp 291-292

Poole P C, Owens J F (2003) Introduction to Nanotechnology. John Wiley & Sons, pp 114-132

Yacaman M J, Yoshida M M, Rendon L, Santiesteban J G (1993) Catalytic growth of carbon microtubules with fullerene structure, Appl. Phys. Lett. 62; 202.

Zhu H W, Xu C L, Wu D H, Wei B Q, Vajtai R. Ajayan P M (2002). Direct Synthesis of Long Single-Walled Carbon Nanotube Strands, SCIENCE. Vol 296, 884.

The invention claimed is:

1. A continuous process for producing carbon nanotubes which includes
supplying a continuous feed of a catalyst in gaseous vapor form, at least one carrier gas, and at least one hydrocarbon gas to an upward flow reactor operating under conditions suitable to produce carbon nanotubes, the gaseous feed being provided to the reactor through a spiral delivery tube located externally relative to the reactor such that a swirling motion is provided to the flow within the reactor, the internal surfaces of the reactor are cleaned of deposits, and the carbon nanotubes are continuously formed in the reactor and are continuously carried by the flowing gases out of the reactor to be collected in a separation system;
wherein the gaseous feed is maintained at a temperature that maintains the catalyst in a gaseous vapor form prior to being supplied to the reactor.

2. The process as claimed in claim 1 wherein the reactor is tubular.

3. The process as claimed in claim 1 wherein the feed is introduced into the reactor through a tangentially extending nozzle.

4. The process as claimed in claim 1 wherein a flow rate of the fluid flow in the reactor is sufficient to entrain at least a portion of the deposits on the internal surfaces of the reactor.

5. The process as claimed in claim 1 wherein the at least one hydrocarbon includes acetylene.

6. The process as claimed in claim 1 wherein the catalyst includes ferrocene.

7. The process as claimed in claim 6 wherein the ferrocene is dissolved in the carrier.

8. The process as claimed in claim 7 wherein the carrier is xylene.

9. The process as claimed in claim 1 wherein the at least one carrier gas includes hydrogen and argon.

10. The process as claimed in claim 1 wherein the reactor is operated at a temperature between 850 and 1100° C.

11. The process as claimed in claim 10 wherein the reactor is operated at a temperature of 1000° C.

12. The process as claimed in claim 1 wherein the feed is introduced into the reactor at a temperature range of 60 to 150° C.

13. A continuous upward flow reactor for the continuous production of carbon nanotubes including
an elongate chamber having an inlet at or near one end and an outlet at or near the opposite end,
a spiral delivery tube connected to the inlet,
a jacket disposed about the spiral delivery tube, and
means for heating the chamber,
wherein the spiral delivery tube is located externally relative to the chamber and is configured to introduce a continuous gaseous feed including a catalyst in gaseous vapor, at least one carrier gas and at least one hydrocarbon gas into the reactor such that the gaseous feed continuously flows with a swirling motion therethrough.

14. The reactor as claimed in claim 13 wherein the spiral delivery tube is co-axial with the chamber.

15. The reactor as claimed in claim 13 wherein the inlet is tangential to the chamber.

16. The reactor as claimed in claim 13 wherein the chamber is cylindrical.

17. The reactor as claimed in claim 13 wherein the chamber is made from a stainless steel.

18. The reactor as claimed in claim 13 wherein the chamber has a glass lining.

19. The process as claimed in claim 1, wherein the separation system is a cyclone.

* * * * *